United States Patent
Lee (10) Patent No.: US 8,630,639 B2
(45) Date of Patent: Jan. 14, 2014

(54) USER EQUIPMENT AND CELL SEARCH METHOD FOR THE SAME

(75) Inventor: Yong Hwan Lee, Gyeonggi-do (KR)

(73) Assignee: Samsung Electronics Co., Ltd., Yeongtong-gu, Suwon-si, Gyeonggi-do (KR)

(*) Notice: Subject to any disclaimer, the term of this patent is extended or adjusted under 35 U.S.C. 154(b) by 318 days.

(21) Appl. No.: 12/825,674

(22) Filed: Jun. 29, 2010

(65) Prior Publication Data

US 2010/0330984 A1    Dec. 30, 2010

(30) Foreign Application Priority Data

Jun. 29, 2009  (KR) .......... 10-2009-0058176

(51) Int. Cl.
*H04Q 7/20*    (2006.01)

(52) U.S. Cl.
USPC ........ 455/434; 455/424; 455/414.2; 455/443; 455/442; 455/440

(58) Field of Classification Search
None
See application file for complete search history.

(56) References Cited

U.S. PATENT DOCUMENTS

| | | | |
|---|---|---|---|
| 6,744,398 B1* | 6/2004 | Pyner et al. | 342/125 |
| 7,599,693 B2* | 10/2009 | Kuriyama | 455/434 |
| 2009/0017820 A1* | 1/2009 | Sohn et al. | 455/435.2 |
| 2012/0100863 A1* | 4/2012 | Klatt et al. | 455/450 |

* cited by examiner

*Primary Examiner* — Charles Appiah
*Assistant Examiner* — Randy Peaches
(74) *Attorney, Agent, or Firm* — Cha & Reiter, LLC (57) ABSTRACT

A user equipment and cell search method for the same are disclosed. The user equipment supports two or more frequency bands. The cell search method for the user equipment includes: receiving intersection data through a first frequency band; and skipping, when the received intersection data is set to a search skip value, cell searching in a second frequency band.

11 Claims, 6 Drawing Sheets

USER EQUIPMENT AND CELL SEARCH METHOD FOR THE SAME

CLAIM OF PRIORITY

This application claims, pursuant to 35 USC 119(*a*), priority to, and the benefit of the earlier filing date of, that patent application entitled, "User Equipment and Cell Search Method for the Same," filed in the Korean Patent Office on Jun. 29, 2009 and afforded serial number 10-2009-0058176, the contents of which are incorporated by reference, herein.

BACKGROUND OF THE INVENTION

1. Field of the Invention

The present invention relates generally to the field of wireless communication devices and, more particularly, to user equipment supporting at least two frequency bands for communication and a cell search method for the same.

2. Description of the Related Art

Frequency bands used for wireless communication may vary depending upon uses, standards, and systems. For example, Table 1 illustrates some frequency bands used by Global System for Mobile Communications (GSM).

TABLE 1

| System | Band | Uplink (MHz) | Downlink (MHz) | Channel number |
|---|---|---|---|---|
| GSM-450 | 450 | 450.4-457.6 | 460.4-467.6 | 259-293 |
| GSM-850 | 850 | 824.0-849.0 | 869.0-894.0 | 128-251 |
| P-GSM-900 | 900 | 890.0-915.0 | 935.0-960.0 | 1-124 |
| E-GSM-900 | 900 | 880.0-915.0 | 925.0-960.0 | 975-1023, 0-124 |
| DCS-1800 | 1800 | 1710.0-1785.0 | 1805.0-1880.0 | 512-885 |
| PCS-1900 | 1900 | 1850.0-1910.0 | 1930.0-1990.0 | 512-810 |

Typically, only one frequency band is utilized in one country. However, in many countries two or more frequency bands may be utilized depending upon the number of frequency bands that are available. For example, only the DCS-1800 (GSM-1800) band is used in Costa Rica while the GSM-850, GSM-900 and GSM-1900 bands are used in Guatemala and El Salvador. Although, Table 1 shows the different frequency bands for GSM systems, similar frequency bands are available for CDMA (Code Division Multiple Access) systems.

Figure 1:
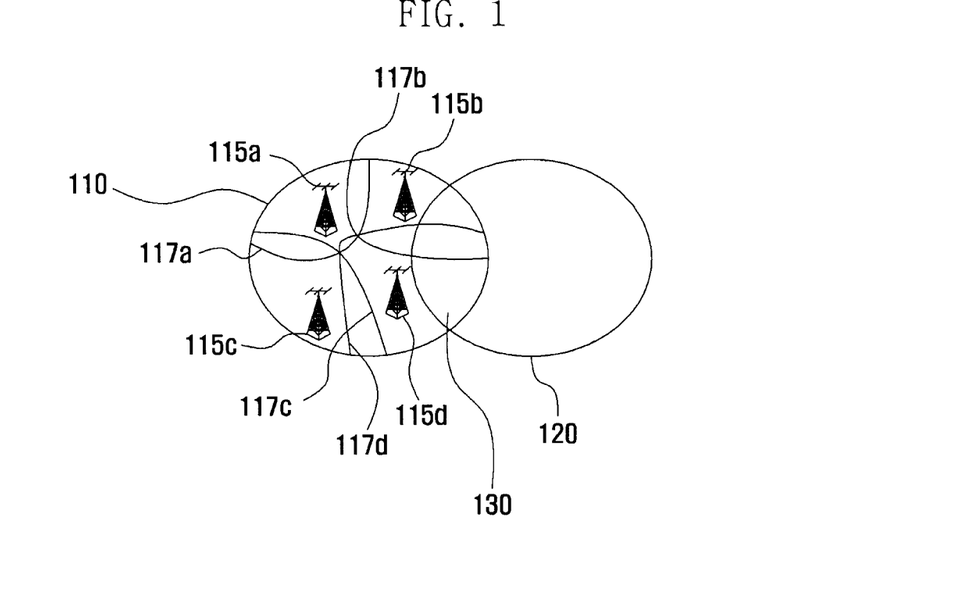
FIGS. 1 and 2 depict coverage areas of networks employing different frequency bands.
Figure 2:
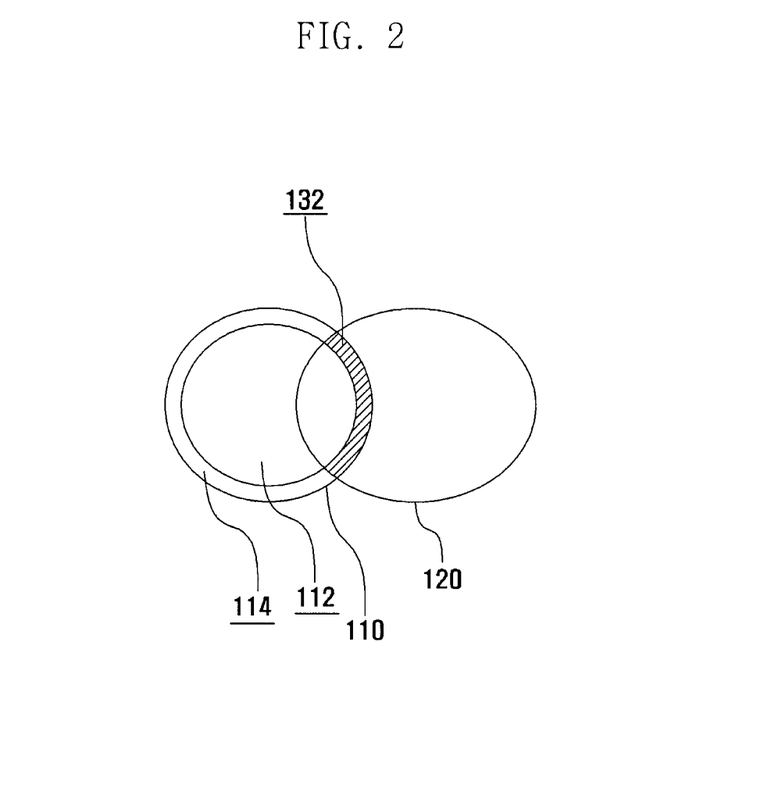

FIGS. 1 and 2 depict coverage areas of networks employing two frequency bands.

In FIG. 1, a first communication area 110 is an oval-shaped coverage area of a network employing a first frequency band (for example, GSM-850). A single base station does not have to cover the entire first communication area 110 for user equipments (e.g., cellular telephones, or other similar wireless communication devices). The first communication area 110 may be composed of coverage areas 117*a*, 117*b*, 117*c* and 117*d* associated with corresponding base stations 115*a*, 115*b*, 115*c* and 115*d* supporting the first frequency band. The coverage areas 117*a*, 117*b*, 117*c* and 117*d* may overlap with each other.

In the description, a communication area, e.g., the first communication area 110 refers to an area that is composed of coverage areas of multiple base stations supporting the same frequency band and enabling user equipments to communicate within the area or within other areas.

A second communication area 120 is an oval-shaped coverage area of a network employing a second frequency band (for example, GSM-1900). The second communication area 120 may be composed of coverage areas of multiple base stations (not shown) supporting the second frequency band in a manner similar to that described with regard to coverage area 110.

In the first communication area 110, user equipment may communicate with a base station or user equipment utilizing the first frequency band. In the second communication area 120, a user equipment may communicate with a base station or another user equipment utilizing the second frequency band. Hence, in the overlapping area 130 where the first communication area 110 overlaps with the second communication area 120, a user equipment may communicate with a base station or another user equipment utilizing either the first frequency band and second frequency band.

In an area that belongs to the first communication area 110 and does not belong to the second communication area 120, a user equipment supporting only the second frequency band may not communicate with a base station. In an area that belongs to the second communication area 120 and not the first communication area 110, a user equipment supporting only the first frequency band may not communicate with a base station.

A user equipment supporting two or more frequency bands are supplied in countries (or regions) employing two or more frequency bands for country-wide use. With a user equipment supporting two or more frequency bands, the user may communicate with a base station or another user equipment throughout the whole country while located in either the first communication area 110 or the second communication area 120.

However, compared with a user equipment supporting one frequency band, a user equipment supporting two or more frequency bands may require higher current consumption for performing a cell search.

SUMMARY OF THE INVENTION

The present invention provides a method that enables a user equipment supporting two or more frequency bands to reduce current consumption when performing a cell search.

In accordance with an exemplary embodiment of the present invention, there is provided a cell search method for a user equipment supporting multiple frequency bands, including: receiving, by the user equipment, intersection data through a first frequency band; and skipping, when the received intersection data is set to a preset search skip value, cell searches in frequency bands other than the first frequency band.

In accordance with another exemplary embodiment of the present invention, there is provided a cell search method for a user equipment supporting multiple frequency bands, including: receiving, by the user equipment, intersection data through a first frequency band; and conducting, when the received intersection data is set to a non-search skip value, cell searches in frequency bands other than the first frequency band.

In accordance with another exemplary embodiment of the present invention, there is provided a user equipment supporting multiple frequency bands, including: an intersection data receiver receiving intersection data through a first frequency band; a cell search unit conducting a cell search; and a control unit controlling the cell search unit to skip cell searches in frequency bands other than the first frequency band when received intersection data is set to a preset search skip value, and controlling the cell search unit to conduct cell searches in frequency bands other than the first frequency band when received intersection data is set to a non-search skip value.

In another aspect of the invention, a communication base station is disclosed. The base station comprises a transceiving device; and a processor in communication with a memory, the memory including code, which when accessed by the processor causes the processor to: receive a measure of a strength of a signal received in a first frequency band by the transceiving device, determine a distance based on the measured signal strength; provide an indication to the transceiving device to transmit an indication of skipping cell scanning in a second frequency band when the determined distance is less that a predetermined distance from a known distance.

In a feature of the present invention, it is possible for a user equipment supporting two or more frequency bands to reduce current consumption due to cell search.

BRIEF DESCRIPTION OF THE DRAWINGS

The features and advantages of the present invention will be more apparent from the following detailed description in conjunction with the accompanying drawings, in which.

DETAILED DESCRIPTION OF THE INVENTION

Exemplary embodiments of the present invention are described in detail with reference to the accompanying drawings. The same reference symbols are used throughout the drawings to refer to the same or like parts. Detailed descriptions of well-known functions and structures incorporated herein may be omitted to avoid obscuring the subject matter of the present invention.

Table 2 describes current consumption of a user equipment according to the number of supported frequency bands.

TABLE 2

| Number of frequency bands | Average current consumption (mA) | Average maximum current consumption in active state (mA) | Time in active state (second) |
|---|---|---|---|
| 1 | 3.2-3.6 | about 70 | 0.06 |
| 2 | 9.0-9.8 | about 120 | 0.09 |

For purposes of describing the invention, the user equipment supporting one frequency band uses the CDMA-850 band, and a user equipment supporting two frequency bands uses the CDMA-850 and WCDMA-2100 bands. As is known in the art, CDMA and WCDMA are communication systems used in the United States, for example.

Referring to Table 2, compared with the user equipment supporting one frequency band, the user equipment supporting two frequency bands consumes much more current (i.e., power) and remains in the active state longer. This is because multiple frequency bands require heavier processing loads related to cell searching and other operations.

In FIG. 2, it is assumed that first communication area 110 is a coverage area of a network supporting a first frequency band (e.g., CDMA-850), and second communication area 120 is a coverage area of a network supporting second frequency band (e.g., WCDMA-2100).

The first communication area 110 may be demarcated into an inner zone 112 and an edge zone 114. The inner zone 112 is an internal region of the first communication area 110, and the edge zone 114 is the remaining region.

When the user enters a border zone 132 (hatched region) at which the edge zone 114 of the first communication area 110 overlaps with the second communication area 120, the user is likely to move from the first communication area 110 to the second communication area 120 in the near future. That is, the user in the border zone 132 may have to communicate through the WCDMA-2100 band and not through the CDMA-850 band according to the direction of movement in the near future. On the other hand, the user in a region of the first communication area 110 excluding the border zone 132 is likely to continue communicating through the CDMA-850 band in the near future.

Hence, when the user is in the border zone 132, it is necessary to search for a cell of the WCDMA-2100 band to handle the possibility of leaving the first communication area 110 in the near future. When the user is in a region of the first communication area 110 excluding the border zone 132, it is not necessary to search for a cell of the WCDMA-2100 band. Searching for a cell of the WCDMA-2100 band in a region of the first communication area 110 excluding the border zone 132 causes an increase in power consumption.

Thus, power consumption may be reduced if cell searching in the WCDMA-2100 band is selectively performed when necessary. That is, the cell search of the second frequency band is performed only when the user is in the border zone 132 of the first communication area 110.

Although a single hatched area 132 is shown, it would be recognized that because of the interconnection of the coverage areas of other base stations, which are not shown, the region 114 contains multiple border zones 132.

Figure 3:
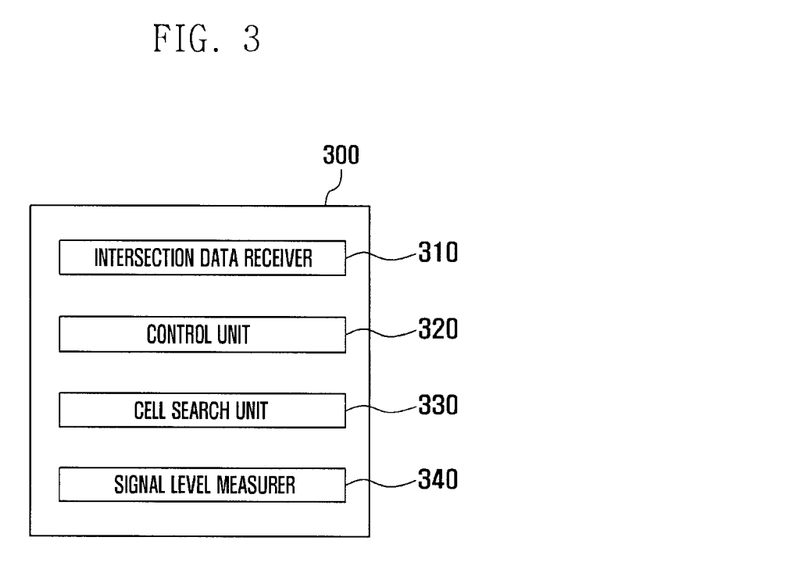
FIG. 3 is a block diagram of a user equipment supporting multiple frequency bands according to an exemplary embodiment of the present invention.

FIG. 3 is a block diagram of a user equipment 300 supporting multiple frequency bands according to an exemplary embodiment of the present invention.

Referring to FIG. 3, the user equipment 300 may include an intersection data receiver 310, a control unit 320, a cell search unit 330, and a signal level measurer 340.

For purposes of describing the invention, the user equipment 300 is described as being connected to a base station through a first frequency band. However, it would be understood that the user equipment 300 may be connected to another frequency of the multi-frequency system and the principles of the invention similarly apply.

In this case, the user equipment 300 sends and receives a call request, message data, and voice data to and from the base station through the first frequency band.

For purposes of describing the invention claimed, assume that the user equipment 300 supports a first frequency band and second frequency band and the first frequency band may be the CDMA-850 band, and the second frequency band may be the WCDMA-2100 band, then the Intersection data indicates whether to search for a cell of another frequency band other than the first frequency band.

The intersection data receiver 310 receives intersection data through the first frequency band (CDMA-850) currently in use.

The intersection data may indicate not only whether to search for a cell of another frequency band other than the first frequency band currently in use but also a condition related to searching for a cell of another frequency band. For example, when the intersection data is set to zero, searching for a cell of another frequency band may be skipped. When the intersection data is set to a non-zero value, a search for a cell of another frequency band may be determined by comparing the value of the intersection data with the signal level of the first frequency band (CDMA-850).

For example, the parameter $S_{intersearch}$, which may be included in System Information Block (SIB) 3 or SIB4 (3GPP TS 25.331 v8.6.0 Mar. 2009), may be used as intersection data. See www.gpp.org for details of this well known specification.

In the present invention, $S_{intersearch}$ may also operate as intersection data related to skipping cell search in another frequency band other than the first frequency band (CDMA-850) when $S_{intersearch}$ is zero. In another aspect of the invention, the parameter $S_{intersearch}$ may further operate as a threshold value related to searching for a cell of another frequency band when the signal level of the first frequency band is lower than the threshold stored in $S_{intersearch}$.

In another embodiment, the intersection data may include a first field indicating whether to search for a cell of another frequency band other than the first frequency band, and a second field indicating a condition related to searching for a cell of another frequency band, i.e., a threshold value.

In the following description, it is assumed that the intersection data set to zero indicates skipping cell searches in frequency bands other than the first frequency band, and the intersection data is set to a non-zero value to search for a cell of another frequency band by comparing the value of the intersection data with the signal level of the first frequency band.

The operation of the intersection data receiver 310 and the intersection data are described further with regard to FIGS. 4A to 4D.

The control unit 320 controls an operation of the user equipment to skip cell searching in frequency bands other than the first frequency band or to search frequency bands according to the intersection data received through the intersection data receiver 310.

That is, when the intersection data received through the intersection data receiver 310 has a designated search skip value, the control unit 320 controls operation of the user equipment to skip cell searching in frequency bands other than the first frequency band. However, when the received intersection data has a value other than the designated search skip value, the control unit 320 controls operation of the user equipment to search for a cell in frequency bands other than the first frequency band. The search skip value is a value set in advance between the user equipment and the base station. Preferably, the search skip value is set to zero to indicate skipping cell searching.

The description "the intersection data is set to or has a search skip value" may indicate that the intersection data is set to a preset search skip value or the intersection data contains a field whose value is set so as not to search for a cell of frequency bands other than the first frequency band.

The operation of the control unit 320 and the search skip value are further described in FIGS. 4A to 4D.

The cell search unit 330 performs cell searching under the control of the control unit 320. The cell search unit 330 searches for a cell of one of the supported frequency bands selected by the control unit 320.

That is, the cell search unit 330 may search only for a cell of the first frequency band (CDMA-850), or search for cells of both the first frequency band and the second frequency band (WCDMA-2100) according to the control of the control unit 320.

The signal level measurer 340 measures the signal level of the first frequency band. The measured signal level may be used to determine whether to search for a cell of the second frequency band.

Figure 4A:
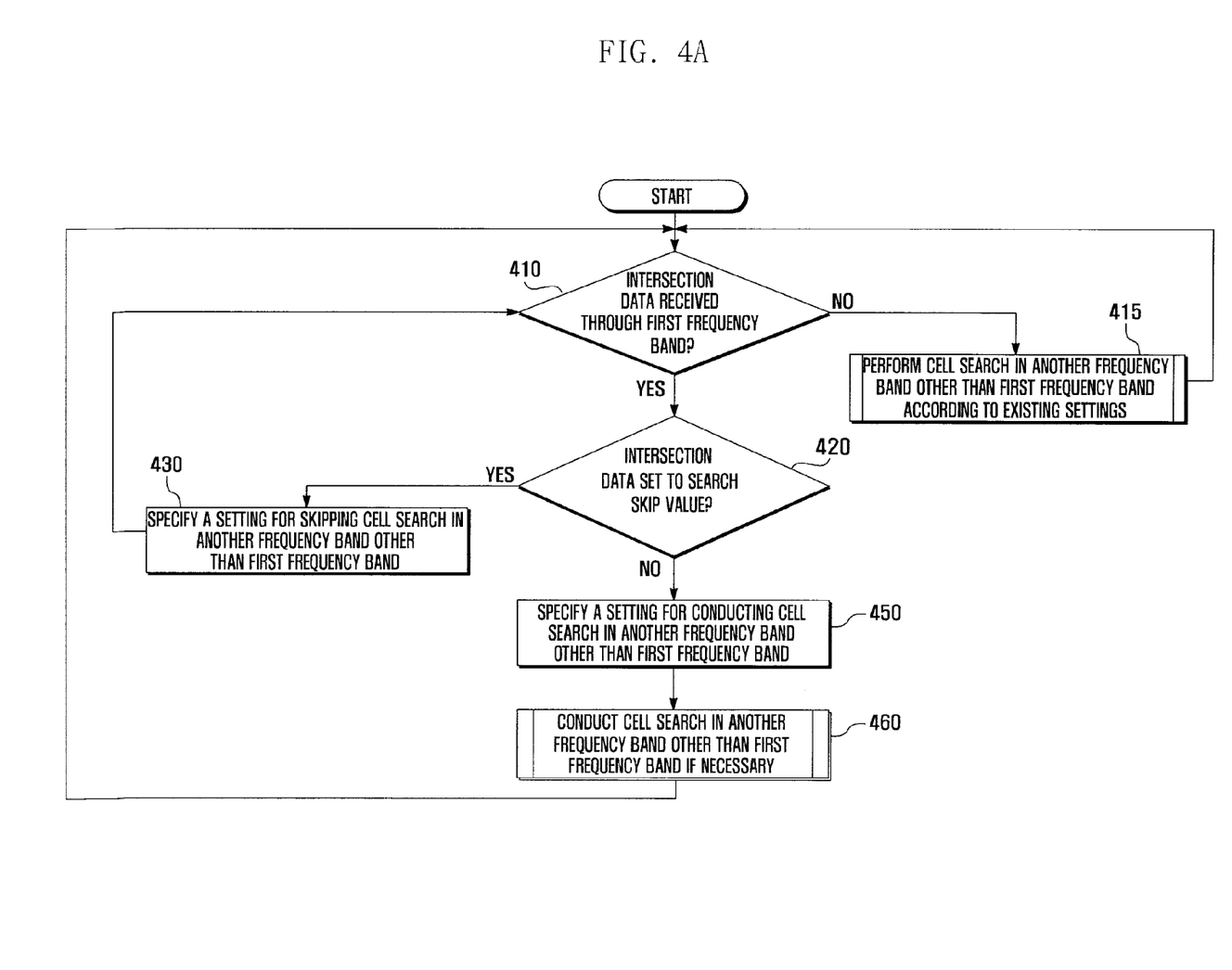
FIGS. 4A to 4D, collectively, illustrate a flow chart a cell search method according to another exemplary embodiment of the present invention.

FIG. 4A is a flow chart illustrating a cell search procedure performed by the user equipment 300.

Referring to FIG. 4A, the user equipment 300 determines whether intersection data is received from the serving base station through the first frequency band (410). The first frequency band is a frequency band currently used by the user equipment 300 for communication. Here, the first frequency band is assumed to be the CDMA-850 band. When the user places a call or sends a message or receives a call or message, the user equipment 300 communicates with the base station through the CDMA-850 band. The user equipment 300 may receive intersection data periodically or non-periodically from the base station.

When intersection data is received from the base station, the process proceeds to step 420. When intersection data is not received, the process proceeds to step 415.

The intersection data indicates whether to search for a cell of another frequency band other than the first frequency band. In the case where the search skip value is preset to zero, and the intersection data has a value of zero, the user equipment does not search for a cell of another frequency band other than the first frequency band (step 430). However, when the intersection data has a non-zero value, the user equipment may search for a cell of another frequency band (step 450).

Figure 4B:
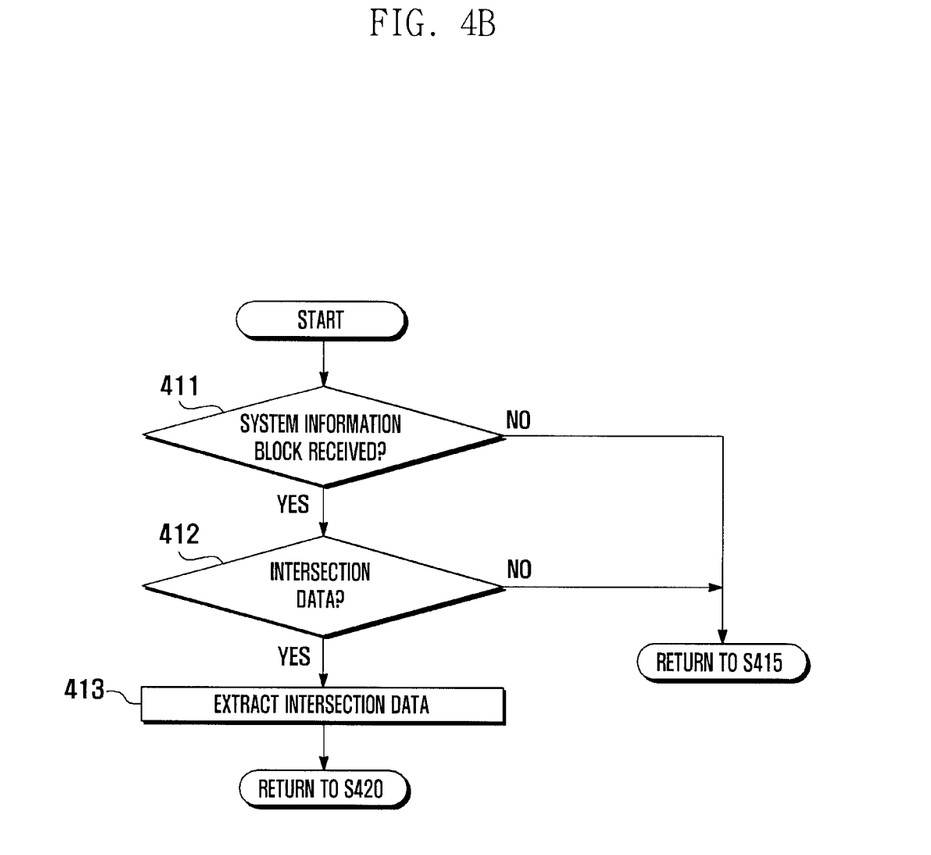

FIG. 4B is a flow chart of step 410 of the process shown in FIG. 4A.

Referring to FIG. 4B, the intersection data receiver 310 determines whether a system information block is received (S411). A system information block may be received periodically or non-periodically through the first frequency band.

The system information block may contain parameter data related to the operation and management of the user equipment. The system information block may be varied in format according to implementation schemes and data types, and may contain or not contain intersection data according to these formats. As these formats are well-known in the art, their detailed description need not be presented herein.

For example, according to 3GPP TS 25.331 v8.6.0, SIB3 or SIB4 may optionally contain intersection data ($S_{intersearch}$). The system information block may further contain parameter data related to the operation and management of the user equipment. 3 GPP represents a global initiative to produce technical specifications and technical reports for a 3G mobile system based on evolved GSM core networks and the radio access technologies that they support (i.e., Universal Terrestrial Radio Access (UTRA) both Frequency Division Duplex (FDD) and Time Division duplex (TDD) modes. Information regarding the 3GPP organization and the series 25 specification may be obtained at www.3gpp.org.

When a system information block is not received, the user equipment 300 performs cell search according to existing settings (415).

When a system information block is received, the user equipment 300 checks whether intersection data is present in the system information block (412). As described before, the system information block may optionally contain intersection data.

When intersection data is not present in the system information block, the user equipment 300 performs cell searching according to existing settings (415).

When intersection data is present in the system information block, the user equipment 300 extracts the intersection data from the system information block (413).

For example, when $S_{intersearch}$ is used as intersection data, the user equipment 300 may extract $S_{intersearch}$ from SIB3 or SIB4, if present.

After extraction of the intersection data, the process proceeds to step 420.

Referring back to FIG. 4A, the cell search unit 330 searches for a cell of a frequency band other than the first frequency band according to existing settings (415). The existing settings may be a setting specified at step 430 or step 450 or a default setting. The default setting may be specified by the user or manufacturer, and may indicate cell search in another frequency band other than the first frequency band or indicate skipping cell search in another frequency band.

Figure 4C:
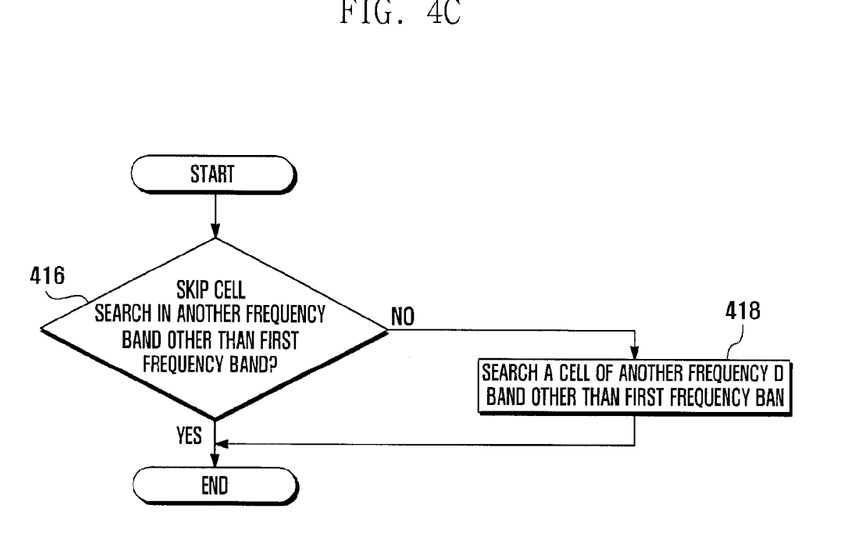

FIG. 4C is a flow chart for step 415 of the procedure shown in FIG. 4A.

Referring to FIG. 4C, the user equipment 300 determines whether a setting indicates skipping cell search in another frequency band other than the first frequency band (416). The setting may be specified at step 430 or step 450. If step 430 or step 450 has not been executed, a default setting, which is specified by the user or manufacturer, may be used.

When the setting indicates cell searching in another frequency band, the user equipment 300 searches for a cell of the other frequency band (418).

At step 418, the cell search unit 330 may perform cell searching in another frequency band only when a preset condition is met. Hence, the searching of the other frequency band is not performed unconditionally. This is described further in connection with FIG. 4D.

When the setting indicates skipping cell search in another frequency band, the process returns to step 410.

Referring back to FIG. 4A, the control unit 320 determines whether the received intersection data is set to the search skip value (420).

The search skip value is a value set in advance between the user equipment and base station, and, in one aspect of the invention, may be set to zero to indicate a skip value.

For example, when $S_{intersearch}$ is used as intersection data, $S_{intersearch}$ may take an integer value greater than or equal to $-32$ and less than or equal to 20. In another embodiment, $S_{intersearch}$ may take an integer value greater than or equal to $-105$ and less than or equal to 91.

When the received intersection data is set to the search skip value, the control unit 320 specifies a setting for skipping cell search in another frequency band other than the first frequency band (430). For example, when $S_{intersearch}$ is set to zero, the user equipment 300 skips cell searching in a second frequency band. When the user equipment 300 remains in a region of the first communication area 110 excluding the border zone 132 (FIG. 2), the serving base station sends intersection data (or $S_{intersearch}$) set to zero to the user equipment 300. Hence, while the user equipment 300 remains in a region of the first communication area 110 excluding the border zone 132, it does not perform cell search in another frequency band, thereby reducing power consumption.

However, when the received intersection data is not set to the search skip value, the control unit 320 specifies a setting for conducting cell searching in another frequency band other than the first frequency band (450). When the user equipment 300 is in the border zone 132, the base station sends intersection data ($S_{intersearch}$) set to a non-zero value to the user equipment 300. Thus, the user equipment 300 searches a cell of another frequency band other than the first frequency band when in the border zone 132, and may provide a continued communication service when the user moves from the first communication area 110 to the second communication area 120.

Thereafter, the user equipment 300 searches a cell of another frequency band other than the first frequency band if necessary (460). If a newly found cell has better signal reception capability than the current cell, the user equipment 300 may select the newly found cell of the different frequency band.

Figure 4D:
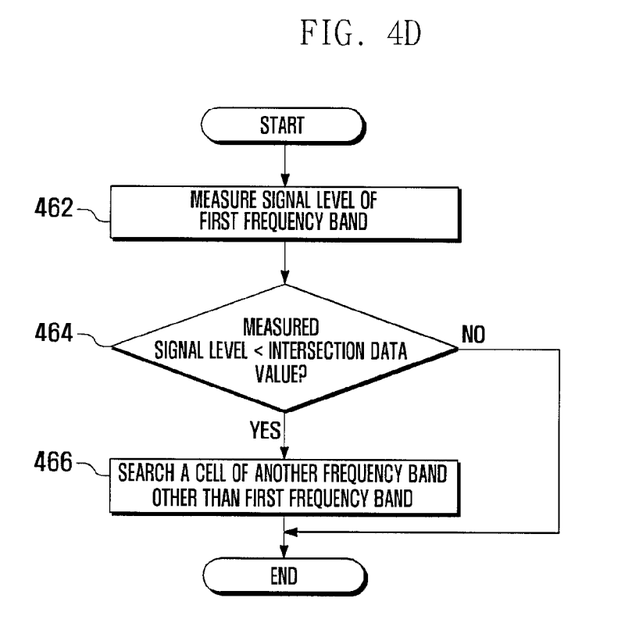

FIG. 4D is a flow chart for step 460 of the procedure shown in FIG. 4A. In FIG. 4D, the necessity of searching for a cell of another frequency band other than the first frequency band is determined by comparing the signal level of a signal in the first frequency band with a value that may be provided with the intersection data.

The signal level measurer 340 measures the signal level of the first frequency band (462). The signal level is typically represented in decibels (dB}. The threshold signal level may be set by the user, the manufacturer or the related standard, or provided in the intersection data The control unit 320 compares the measured signal level with the received intersection data (464). That is, the intersection data received at step 410 may act as a threshold value.

When the measured signal level is lower than the value associated with the intersection data, the user equipment 300 searches for a cell of in a second frequency band (466). For example, when the threshold value in the intersection data is set to 1 dB and the measured signal level of $-1$ dB, the measured signal level is less than or equal to the threshold value set in the intersection data, and the search of the cell of another frequency is performed. However, in the case, when the measured signal level is 3 dB, a cell search of another frequency band is regarded as unnecessary.

In the case of a handover, where the equipment is moving between two cells, cell search in another frequency band other than the first frequency band may be regarded as necessary. In handover, selection of the best cell may be more preferable for the seamless communication service. That is, a comparison between a signal strength received from the first and second frequency bands is made and the user equipment selects the frequency band that has a more acceptable signal strength (e.g., a greater signal strength).

At step 418 (FIG. 4C), the necessity of searching for a cell of another frequency band other than the first frequency band is determined in the same manner as in FIG. 4D.

As an example of the processing described herein, assume that the first base station 115a and third base station 115c (FIG. 1) send intersection data set to the search skip value to the user equipment 300, and the second base station 115b and fourth base station 115d send intersection data set to a non search skip value.

When the user moves from the area 117a to a non-overlapping zone of the area 117c (a zone of the area 117c not belonging to the area 117a), the user equipment 300 may conduct cell search in another frequency band other than the first frequency band if an existing cell search method were used. In the present invention, as the user equipment 300 receives intersection data set to the search skip value, the user equipment 300 conducts cell searching only in the first frequency band, thereby reducing power consumption.

When the user moves from the area 117b to a non-overlapping zone of the second communication area 120, the user equipment 300 receives intersection data set to a non-search skip value and conducts a cell search in another frequency band other than the first frequency band through the procedure of FIG. 4D, thereby maintaining network connection.

Figure 5:
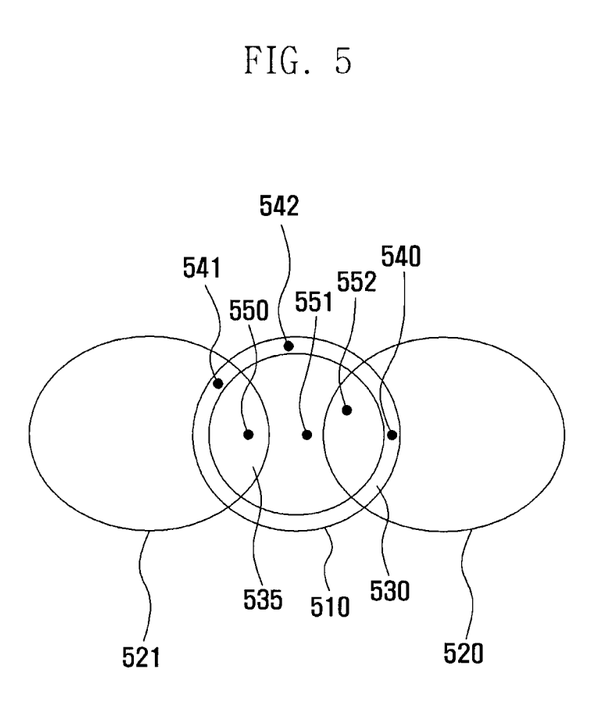
FIG. 5 depicts coverage areas related to different frequency bands in the cell search method.

FIG. 5 depicts coverage areas related to different frequency bands.

In FIG. 5, it is assumed that a first communication area 510 is a coverage area of a network supporting a first frequency band (CDMA-850), and a second communication area 520 is a coverage area of a network supporting a second frequency band (WCDMA-2100).

The first communication area 510 is divided into a central zone 535 and an edge zone 530. Demarcation between the central zone 535 and the edge zone 530 may be specified by the network operator. For efficient cell search, the edge zone 530 may be defined to be a zone within a given distance (for example, 1 km) from the boundary line of the coverage area of the first communication area 510.

In the edge zone 530, a first base station 540 is located at a zone overlapping with the second communication area 520 and a second base station 541 is located at a zone overlapping with a third communication area 521. The first base station 540 and the second base station 541 send intersection data ($S_{intersearch}$) set to a non-search skip value (non-zero) to user equipments, which may be moving from the first communication area 510 to the second communication area 520, or to the third communication area 521, in the near future. The remaining base stations 542, 550, 551 and 552 send intersection data ($S_{intersearch}$) set to a search skip value (zero) to user equipments. Upon reception of the intersection data, each user equipment may conduct cell search according to the value of the intersection data as described in connection with FIGS. 4A to 4D.

Hence, the user equipments served by the first base station 540 or the second base station 541 may conduct cell search in both the first frequency band and the second frequency bands if necessary. The user equipments served by the remaining base station 542, 550, 551 or 552 may skip cell search in the second frequency band. Thus, power consumption is reduced.

In an embodiment of the invention, a location measurement technique may be employed in the base station to measure the location of a user equipment. The location measurement technique may, for example, measure a signal strength provided by the user equipment and then determine a distance between the base station and the user equipment based on the measured signal strength.

When the user equipment 300 is in a region of the edge zone 530 that overlaps with the second communication area 520 or the third communication area 521, the serving base station may send intersection data set to a non-search skip value to the user equipment 300. That is, the measured distance is greater than a known distance from the base station but less than the distance to the edge of the base station coverage. Otherwise, the serving base station may send intersection data set to a search skip value (zero) to the user equipment 300. Thus, a search for a cell in a second frequency band is initiated. As would be recognized, at this time, the user equipment performs a search of both the first and second frequency bands (i.e., a handoff procedure) so that communications may be maintained as the user equipment transitions from one cell to the next cell.

Table 3 illustrates current consumption of a user equipment supporting two frequency bands employing the cell search method of the present invention.

TABLE 3

| | Average current consumption (mA) | Average maximum current consumption in active state (mA) | Time in active state (second) |
|---|---|---|---|
| User equipment supporting one frequency band | 3.2-3.6 | about 70 | 0.06 |
| Existing user equipment supporting two frequency bands | 9.0-9.8 | about 120 | 0.09 |
| User equipment, of present invention, supporting two frequency bands | 3.2-3.6 | about 70 | 0.06 |

It can be seen from Table 3 that the user equipment supporting two frequency bands of the present invention consumes much less current and spends less time in the active state in comparison to the existing user equipment supporting two frequency bands.

The user equipment of the present invention is a portable electronic device, such as a mobile terminal, personal digital assistant (PDA), navigation aid, digital broadcast receiver, or portable multimedia player (PMP).

The user equipment of the present invention may be one of various types of mobile terminals, such as a folder type mobile terminal, bar type mobile terminal, flip type mobile terminal, slide type mobile terminal, rotating type mobile terminal, and combination thereof.

Those skilled in the art may understand that the steps of flow charts and combinations thereof may be realizable as computer program instructions operable in the controller. The computer program instructions can be loaded in a general purpose computer, a special purpose computer, or the processor of a programmable data processing apparatus. Hence, the computer program instructions executed by the controller, computer or processor can create a means performing the functions represented by the flow charts. In addition, the invention described herein may be performed in dedicated hardware (e.g., ASIC, FPGA) that operate as special purpose computers. Furthermore, it would be understood that the computer program instructions (code) may be stored in a memory, which when accessed by the controller, computer or processor, cause the controller, computer or processor to perform the processing shown herein.

Although exemplary embodiments of the present invention have been described in detail hereinabove, it should be understood that many variations and modifications of the basic inventive concept herein described, which may appear to those skilled in the art, will still fall within the spirit and scope of the exemplary embodiments of the present invention as defined in the appended claims.

What is claimed is:

1. A cell search method for a user equipment supporting multiple frequency bands, comprising:
   responsive to the user equipment being located in an intersection region which is the intersection of coverage areas of first and second frequency bands, respectively, receiving, by the user equipment, intersection data through the first frequency band;
   conducting a cell search in the second frequency band when the received intersection data is not set to a search skip value, including:
      receiving a measure of a strength of a signal in the intersection data received in the first frequency band;
      determining a distance based on the measured signal strength; and searching the second frequency band when the determined distance is greater than or equal to a predetermined distance from a known distance indicated by the measured signal strength in the intersection data; and skipping, when the received intersection data is set to a search skip value or when the determined distance is less than a predetermined distance indicated by the measured signal strength in the intersection data, cell searching in the second frequency band.

2. The cell search method of claim 1, wherein receiving the intersection data through the first frequency band comprises:

receiving a system information block through the first frequency band; and extracting the intersection data from the received system information block.

3. A cell search method for a user equipment supporting multiple frequency bands, comprising:

responsive to the user equipment being located in an intersection region which is the intersection of coverage areas of first and second frequency bands, respectively, receiving, by the user equipment, intersection data through the first frequency band; and conducting a cell search in the second frequency band, when the received intersection data is set to a non-search skip value and a measured signal strength of a signal received through the first frequency band is less than a threshold value, including:

receiving a measure of a strength of a signal in the intersection data received in a first frequency band;

determining a distance based on the measured signal strength; and searching the second frequency band when the determined distance is greater than or equal to a predetermined distance indicated by the measured signal strength in the intersection data.

4. A user equipment supporting multiple frequency bands, comprising:

an intersection data receiver, responsive to the user equipment being located in an intersection region which is the intersection of coverage areas of first and second frequency bands, respectively, for receiving intersection data through a first frequency band, wherein the intersection data includes a search skip value or a non-search skip value set by a base station based on a distance, determined from a measured signal strength in a signal in the first frequency band, being greater than or equal to, or being lesser than a predetermined distance, respectively;

a cell search unit conducting a cell search of the second frequency band; and a control unit controlling the cell search unit to skip cell searching in the second frequency band when received intersection data is set to the search skip value based on the determined distance being less than the predetermined distance, and controlling the cell search unit to conduct the cell search in the second frequency band when received intersection data is set to the non-search skip value based on the determined distance being greater than or equal to the predetermined distance.

5. A user equipment comprising:

a controller comprising:

a processor in communication with a memory, the memory including code, which when accessed by the processor, causes the processor to:

respond to the user equipment being located in an intersection region which is the intersection of coverage areas of first and second frequency bands, respectively, to receive a signal and a measure of signal strength from a receiving unit, the received signal being received through the first frequency band;

extract intersection data from the received signal, the intersection data including a non-search skip value set by a base station based on a distance, determined from the measured signal strength in the signal in the first frequency band, being greater than or equal to, or being lesser than a predetermined distance as a threshold value, respectively; and perform a cell search of the second frequency band when the received intersection data is set to the non-search skip value based on the determined distance being greater than or equal to the predetermined distance as the threshold value.

6. The user equipment of claim 5, further comprising:

extracting the search skip value from intersection data; and skipping cell searching based on the extracted search skip value.

7. The user equipment of claim 6, wherein the search skip value and the threshold value are different elements of the intersection data.

8. The user equipment of claim 7, wherein the search skip value and the threshold value are the same elements of the intersection data.

9. A communication base station comprising:

a transceiving device; and a processor in communication with a memory, the memory including code, which when accessed by the processor causes the processor to:

receive a measure of a strength of a signal received in a first frequency band by the transceiving device, determine a distance based on the measured signal strength; and provide an indication to the transceiving device to transmit an indication of skipping cell scanning in a second frequency band when the determined distance is less than a predetermined distance from a known distance.

10. The station of claim 9, wherein the known distance is a distance defining a coverage area of the station.

11. The station of claim 9, wherein the predetermined distance is 1 kilometer.

* * * * *